March 23, 1954

C. HARDEN 2,672,900

JUICE EXTRACTOR

Filed Nov. 6, 1951

CARL HARDEN,
INVENTOR.

BY *Lyon & Lyon*

ATTORNEYS

March 23, 1954  C. HARDEN  2,672,900
JUICE EXTRACTOR

Filed Nov. 6, 1951  3 Sheets-Sheet 2

CARL HARDEN,
INVENTOR.

BY

*Lyon & Lyon*

ATTORNEYS

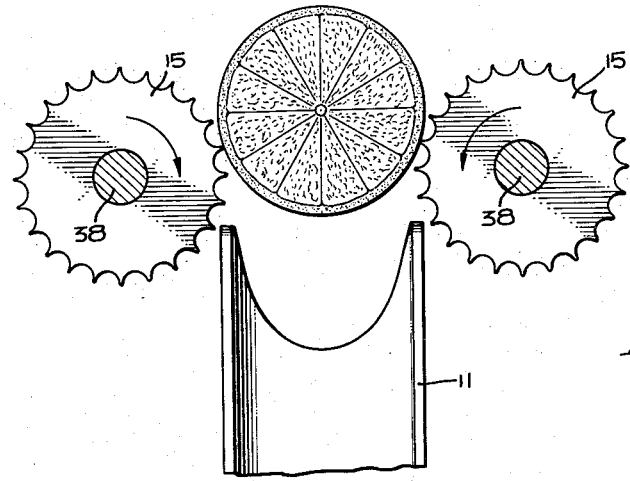
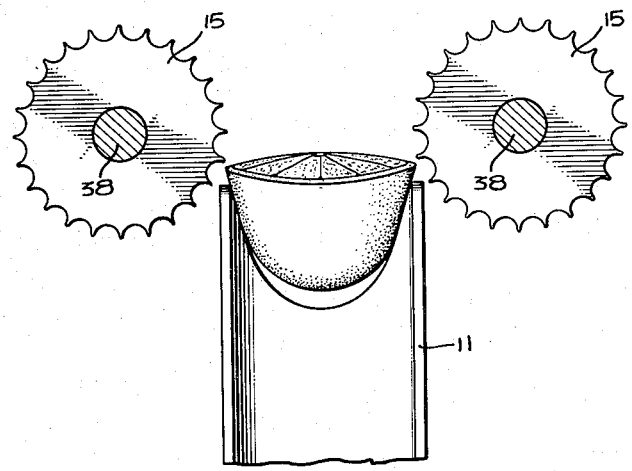
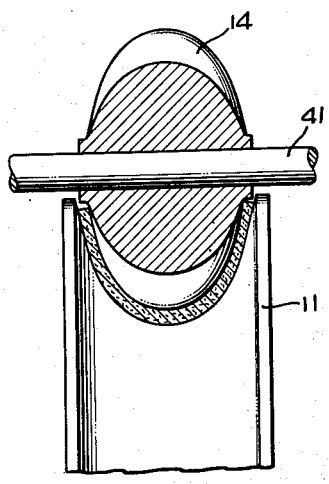

Patented Mar. 23, 1954

2,672,900

UNITED STATES PATENT OFFICE 2,672,900

JUICE EXTRACTOR

Carl Harden, Whittier, Calif., assignor to Brown Citrus Machinery Corporation, Whittier, Calif., a corporation of California Application November 6, 1951, Serial No. 255,004

14 Claims. (Cl. 146—3)

This invention relates to juice extracting machines, and has particular reference to machines for extracting juice from citrus fruits.

A number of machines have been designed for extracting juice from citrus fruits. Of these, two general types are in use. The first of these types usually employs a cup type conveyor or retainer which retains a fruit half, and a reamer adapted to enter the fruit and ream the juice therefrom. Machines of this type possess the advantage of being highly efficient. Inasmuch, however, as accurate synchronism must be maintained between the conveyors and reamers, they are of rather intricate design and expensive to manufacture and maintain and are relatively large in size. Moreover, such machines are, in general, not capable of handling fruit of widely varying size without separate adjustment. Such adjustment normally requires cessation of the operation of the machine. The second general type of juice extractor does not employ the reaming principle, but rather presses or squeezes fruit halves or quarters to force therefrom the juice. Such machines are, in general, smaller and more rugged and are less expensive to manufacture and maintain than those heretofore described. They possess the disadvantage, however, of being quite inefficient. Moreover, the quality of juice suffers when extracted by crushing fruit, due to tearing of the peel which necessarily occurs in such a machine.

In accordance with the present invention, a machine is provided which possesses the advantages of each of these two types. While the machine is of the reamer type, it requires no synchronism between the moving parts, and hence it is of exceedingly simple and compact design, is of small size and is inexpensive to manufacture and maintain. Moreover, the machine of the present invention is operable at exceedingly high speeds with good efficiency, and can handle fruits of widely varying sizes without separate adjustment.

Accordingly, it is an object of the present invention to provide a juice extracting machine which can be efficiently operated at exceedingly high speeds.

It is a further object of the present invention to provide such a machine which is inexpensive to construct and maintain.

It is an additional object of this invention to provide such a machine which is of compact size.

It is another object of this invention to provide such a machine which can continuously handle fruit of widely varying sizes.

It is a further object of this invention to provide such a machine which utilizes a reamer for extracting juice from fruit, but which requires no synchronism between the feeding and juice extracting mechanisms.

Other objects and advantages of the invention will be apparent from the following detailed description of a preferred embodiment thereof when read in connection with the accompanying drawings.

In the drawings,

Fig. 5 is a section taken along the line 5—5 of Fig. 3.

Fig. 6 is a view similar to Fig. 5 illustrating the operation of a part of the machine.

Fig. 7 is a section taken along the line 7—7 of Fig. 3.

Figure 1:
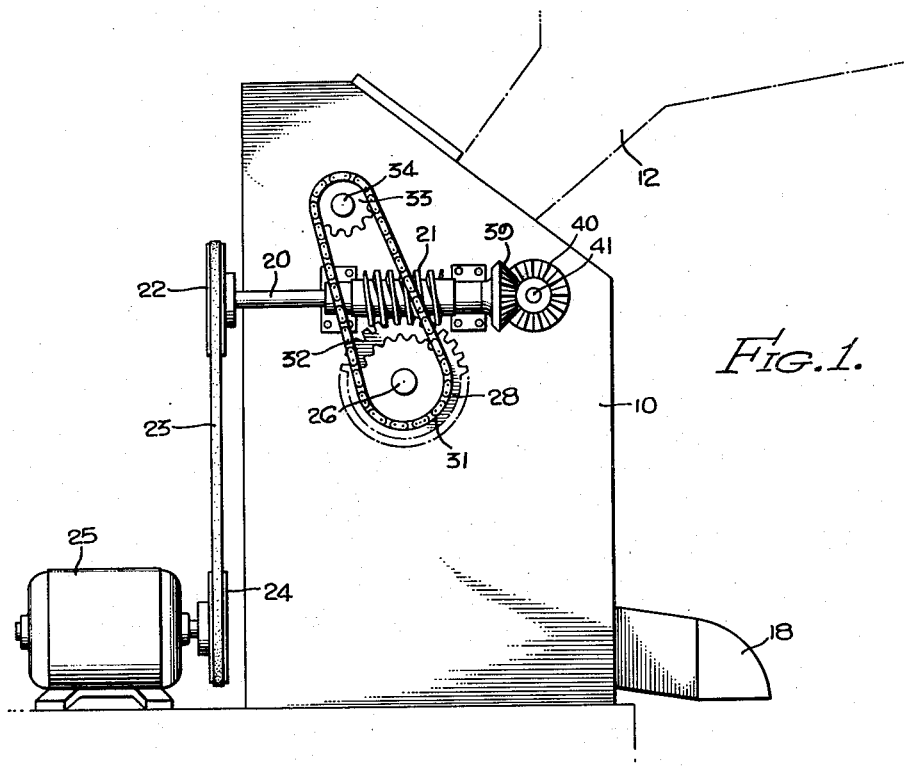
Fig. 1 is a side elevation of a juice extracting machine embodying the present invention.
Figure 2:
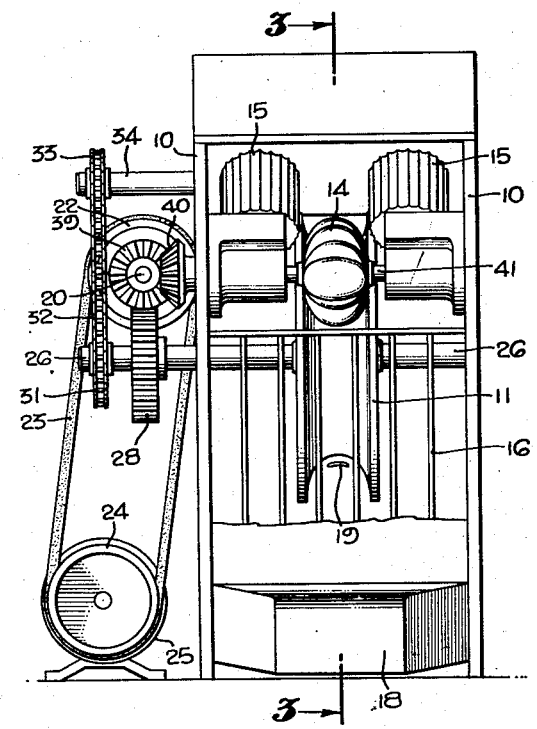
Fig. 2 is a frontal elevation of the machine shown in Fig. 1 with the cover portion removed.

Referring now to the drawings, a citrus juice extracting machine embodying the present invention in its preferred form is seen to comprise a housing 10 within which is disposed a rotating, grooved feeder wheel 11 adapted to receive fruit portions from a suitable trough 12. The fruit portions are preferably fruit halves, although quarters or other fractions may be employed. Feeder wheel 11 is preferably faced with a resilient material, such as rubber, in order to provide better traction. Moreover, fruit portions of widely varying sizes can more readily be handled since the resilient facing permits the groove to accommodate to different sized fruit portions.

A suitable cutting and conveying mechanism, not shown, is associated with the trough 12 to feed the fruit portions therein. Since these form no part of the present invention, and many different types of cutting and feeding mechanisms are well known in the art, it is deemed unnecessary to set forth these portions in detail herein. Also located within the housing 10 is a reamer 14 which extends into the groove of the feeder wheel and which is adapted to enter and ream the juice from the fruit portions carried on the feeder wheel 11. While in the drawings the reamer is shown to be of the broad fluted type, having a generally elliptical cross section, which type has been found to be preferred, other types of reamers, for example burr wheels, or the like, may be used. In addition, the cross section of the reamer is preferably similar to that of the annular groove in the feeder wheel in order to insure uniform reaming of the fruit. Above the feeder wheel 11 is disposed a pair of symmetrically placed loader wheels 15 which rotate, in opposite directions, about longitudinal axes which are generally tangential to the feeder wheel. As will be described hereinafter, these loader wheels serve to seat the fruit portions securely into the annular groove of the feeder wheel to prevent jamming thereof.

Figure 3:
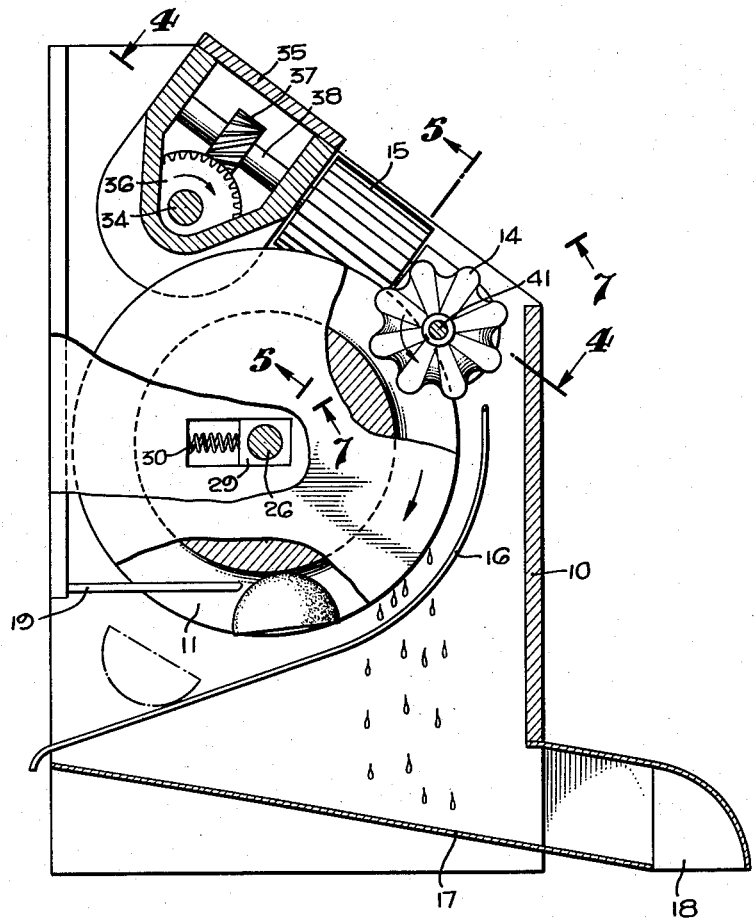
Fig. 3 is a section taken along the line 3—3 of Fig. 2.

Commencing just below the reamer 14 and extending about the lower portion of the feeder wheel is a separator grid 16 which serves to separate the fruit peels from the juice after the fruit portions have been reamed. Disposed below this separator grid is a drip pan 17 feeding to a juice spout 18 from which flows the extracted juice. A horizontal stripper arm 19 attached to the back portion of the machine extends into the grooved portion of the feeder wheel 11 at the bottom thereof, as best seen in Fig. 3. This stripper arm is operative to engage the fruit peels after the juicing operation and strip the same from the feeder wheel onto the separator grid 16. The fruit peels which are too large to fall through the separator grid 16 then tumble out a disposal opening. While such opening is illustrated as being located at the rear of the machine, it will be obvious that the fruit peels can be ejected at other locations on the machine without affecting the operation thereof.

The drive mechanism for the various parts will now be described. A horizontal shaft 20 upon which is mounted a worm 21 is utilized as a drive shaft. It will, of course, be readily apparent that other shafts in the mechanism could also be used as the drive shaft. Attached to the shaft 20 is a sheave 22 operatively associated by means of a chain 23 with a second sheave 24 mounted upon the drive shaft of a motor 25. As seen, the shaft 20 is rotated by motor 25. The feeder wheel 11 is carried by a shaft 26 which carries a worm wheel 28. The worm 21 and worm wheel 28 will cause a corresponding rotation of the feeder wheel 11 in the direction indicated. The speeds of the parts are in no way critical provided the speed of the reamer wheel substantially exceeds that of the feeder wheel. Excellent operation has been accomplished where the worm gear arrangement was such as to step down the rotation of the feeder wheel 11 to the reamer wheel in the ratio on the order of 1–40. As seen in Fig. 3, shaft 26 is mounted in a bearing 29, which in turn is carried in a horizontal slot in the side of the housing 10. A compression spring 30 is provided which tends to force the bearing 29 and with it the shaft 26 to the right, as viewed in Fig. 3. Identical mounting is provided for the other end of the shaft 26 at the other side of the housing 10. With this arrangement the feeder wheel floats, the spring 30 tending to force the same to the right, as viewed in Fig. 3. The compression on the spring 30 is regulated to control the pressure with which the reamer 14 engages the fruit portions in the feeder wheel to make allowance for fruit of varying peel thicknesses. Thus, if the machine were adjusted to operate with maximum efficiency with fruit of a certain sized peel thickness, and a larger portion of fruit were introduced into the feeder wheel having a substantially greater peel thickness, if the parts were rigidly fixed, the reamer 14 would necessarily ream well into the outer pulp and peel of the fruit. This undesirable result is avoided in the present machine since the increased pressure of the reamer against the large sized fruit will force the feeder wheel backwardly against the compression spring 30, thereby maintaining the reaming pressure relatively constant regardless of variations in fruit size.

Figure 4:
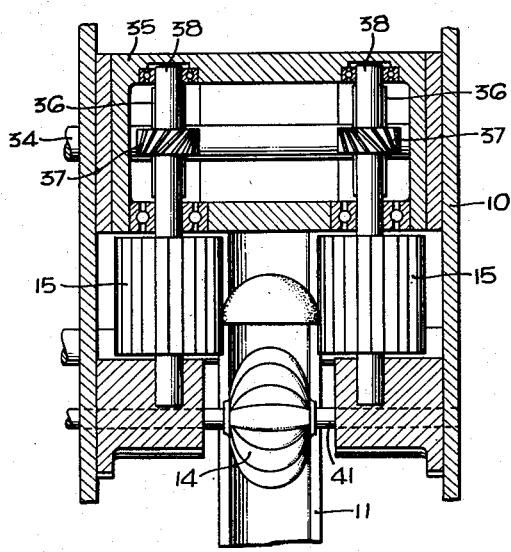
Fig. 4 is a section taken along the line 4—4 of Fig. 3.

Also carried by shaft 26 is a sprocket 31 which carries a chain 32 associated with which is a second sprocket 33 carried by a shaft 34. The shaft 34 extends into a gear box assembly 35 in which is disposed the mechanism for rotating the loader wheels 15. Thus, as best seen in Figs. 3 and 4, carried by shaft 34 is a pair of helical gears 36, each of which engages one of a pair of helical gears 37. Gears 37 are mounted respectively on shafts 38, each of which is journaled in suitable bearings in the gear box. Each of the shafts 38 carries one of the loader wheels 15. As seen in Fig. 4, the gears 37 are arranged to rotate the loader wheels 15 about their respective axes in opposite directions. While as before the speed of rotation of the parts is not critical, it has been found preferable to employ a gear and sprocket ratio such as to rotate the loader wheels 15 at the same peripheral speed as the feeder wheel 11.

To drive the reamer 14, a pair of mitre gears 39 and 40 is provided. One of these is mounted upon shaft 20, and the second is mounted upon a shaft 41. The shaft 41 extends through the housing 10 and is supported by suitable bearings, not shown. Rigidly carried by the shaft 41 is the reamer 14. The gear ratios employed are preferably such that the reamer 14 will rotate at the same speed as the shaft 20. Moreover, the arrangement is such that the reamer 14 will rotate in a direction opposite to that of the feeder wheel as indicated in Fig. 3.

As will be apparent from the above, the operation of the motor 25 will cause shaft 20 to rotate at the motor speed. This will rotate the feeder wheel 11 through the worm 21 and worm wheel 28 at a speed considerably lower than that of the shaft 20. Simultaneously, the chain drive will rotate the shaft 34 which, through the gears 37 and gears 36, will rotate the loader wheels 15 in opposite directions, as indicated in Fig. 5. In like manner, mitre gears 39 and 40 will rotate, through shaft 41, the reamer 14 at approximately motor speed.

Referring particularly to Figs. 5 through 7, the operation of the loader wheels 15 will now be described. While relatively small fruit halves will seat properly in the feeder wheel 11, when a larger fruit half such as that shown in Figs. 5 through 7 is encountered, it must be forcibly seated in the grooved portion of the feeder wheel. If this is not done, the fruit half will simply bounce back from the feeder wheel, thereby jamming the machine by preventing all following fruit from entering. To firmly seat the fruit halves in the feeder wheel, the loader wheels 15 are provided. About the outer surface of each of these wheels are disposed fruit gripping means which preferably consist of a series of rather sharp longitudinal ridges adapted to firmly grip the fruit as the same contacts the feeder wheels. Thus, as the fruit half is delivered from the trough 12 into contact with the feeder wheels 15, the rotation of these wheels is such as to force the fruit halves downwardly into the grooved portion of the feeder wheel. Moreover, the feeder wheels are spaced a distance substantially equal to the width of the feeder wheel, with the result that the fruit is distorted, as shown in Fig. 6, so as to snugly fit into the feeder wheel. Inasmuch as the groove of the feeder wheel conforms generally to the cross section of the reamer, this distortion of the fruit halves will insure a full and uniform reaming of the side portions as well as the bottom portion of the fruit. This effect is illustrated in Fig. 7.

In addition to the above described function, the loader wheels, in connection with the feeder wheel, distort the fruit halves making possible the rapid, non-synchronous operation of the machine. Thus, it has been found that the normal shape of a citrus fruit half is such that a reamer or burr wheel rotating on its central axis, that is, on an axis parallel to the cut face of the fruit half cannot be used without scoring the fruit sides, thereby mutilating the fruit with consequent inefficient juice extraction as well as other disadvantages. Thus, in order to make the reamer wheel curvature conform to the inner peel of a normal fruit half, which is essential to an efficient reaming operation, the central axis of the wheel will lie beyond the face of the fruit half. The result has been that in any successful reamer type juice extracting machine, the axis of rotation of the reamer has been perpendicular to the plane of the cut face of the fruit. This relationship, of course, necessitates synchronization of the fruit conveyor with the reamer. As an important feature of the present invention, it has been found that if fruit halves are distorted, as by the compressing action of the loader wheels and the groove of the feeder wheel for larger size fruit halves, or just the groove of the feeder wheel for fruit halves too small to be engaged by the loader wheels, it then becomes possible to employ a reamer wheel having a central axis parallel to the cut face of the fruit. Thus, the compressing action of the loader wheels causes the curvature of the peel of the fruit half to flare outwardly in a direction perpendicular to the axes of the loader wheels, as viewed in Fig. 5, or after the fruit halves are seated in the feeder wheel, tangential of the feeder wheel. In addition, such compressing action causes the cut face of the fruit half to bow outwardly, as shown in Fig. 6. As is apparent from the shape of the deformed fruit half, and as shown in Fig. 7, the central axis of a reamer wheel having a curvature corresponding to the inner curvature of the peel will lie well above the cut face of the fruit with the result that such a reamer can be successfully employed. As above described, this eliminates the need for synchronization of the parts, making possible a simple, efficient and high speed machine.

To operate the above described machine, it is merely necessary to feed fruit portions down the trough 12. Such fruit portions are gripped by the loader wheels 15. For larger fruit halves, much of this distortion is caused by the compressing action of the loader wheels alone. For smaller fruit halves, however, this distortion is caused primarily by the configuration of the feeder wheel groove. The feeder wheel then carries the fruit portions into contact with the rapidly spinning reamer 14 which reams the juice from the fruit. The juice then falls through the separator grid 16 onto the drip pan and out the juice spout. The reamed fruit peels may be carried by the feeder wheel 11 until the same are engaged by the stripping arm 19 which strips the fruit peels from the feeder wheel. It has been found, however, that most peels will be forced from the feeder wheel by the action of the reamer just after the juice has been extracted from the fruit half. The peels then fall through a disposal opening from the machine into a suitable receptacle. With very small sized fruits, the feeder wheel 11 will be separated from the reamer 14 by but a short distance due to the action of the compression spring 30. When larger sized fruit is encountered, the feeder wheel will be forced backwardly against the compression spring 30 to provide further clearance between the feeder wheel and the reamer.

A machine designed in accordance with the invention above described has been found to possess a number of very marked advantages. Among these is that there is no need for synchronism between the various moving parts, with the result that the machine is simple and inexpensive to construct and maintain and exceedingly high speed operation can be obtained. In addition, the machine will efficiently operate without adjustment even though relatively wide variations in fruit size are encountered.

It is to be understood that the form of the invention shown and described is to be taken as a preferred example of the same, and that various embodiments thereof may be resorted to without departing from the spirit of the invention or the scope of the appended claims.

I claim:

1. In a machine of the class described, a vertical feeder wheel having a peripheral annular groove therein, a pair of spaced loader wheels adjacent said feeder wheel and cooperating therewith to deliver fruit portions to said annular groove, and a reamer extending into the groove of said feeder wheel.

2. In a machine of the class described, a vertical feeder wheel having a fruit portion receiving peripheral annular groove therein, a pair of spaced loader wheels adjacent said feeder wheel and operative to seat fruit portions into the groove of said feeder wheel, and a reamer adjacent said feeder wheel and operative to engage said fruit portions.

3. In a machine of the class described, a vertical feeder wheel having a peripheral annular groove therein, a pair of spaced loader wheels adjacent said feeder wheel and cooperating therewith to deliver fruit portions to said annular groove, a reamer extending into the groove of said feeder wheel, and a separator grid disposed about the lower portion of said feeder wheel.

4. In a machine of the class described, a vertical feeder wheel having a peripheral annular groove therein, a pair of spaced loader wheels adjacent said feeder wheel and cooperating therewith to deliver fruit portions to said annular groove, fruit gripping means disposed about the outer surface of said loader wheels, and a reamer extending into the groove of said feeder wheel.

5. In a machine of the class described, a vertical feeder wheel having a fruit portion receiving peripheral annular groove therein, a pair of spaced, substantially identical loader wheels adjacent said feeder wheel operative to receive fruit portions and to seat the same into the groove of the said feeder wheel, a reamer adjacent said feeder wheel and operative to engage said fruit portions, and a separator grid disposed about the lower portion of said feeder wheel.

6. In a machine of the class described, a vertical feeder wheel having a fruit portion receiving peripheral annular groove therein, a pair of spaced, substantially identical loader wheels adjacent said feeder wheel, fruit gripping means disposed about the outer surface of said loader wheels, said loader wheels operative to receive fruit portions and to seat the same into the groove of the said feeder wheel, a reamer adjacent said feeder wheel and operative to engage said fruit portions, and a separator grid disposed about the lower portion of said feeder wheel.

7. In a machine of the class described, a rotating vertical feeder wheel having a peripheral annular groove therein, a pair of oppositely rotating spaced loader wheels adjacent said feeder wheel and cooperating therewith to deliver fruit portions to said annular groove, and a reamer extending into the groove of said feeder wheel, said reamer rotating in a direction opposite to and at a speed substantially in excess of the said feeder wheel.

8. In a machine of the class described, a vertical feeder wheel having a fruit portion receiving peripheral annular groove therein and rotating about a horizontal axis, a pair of oppositely rotating spaced loader wheels adjacent said feeder wheel, fruit gripping means disposed about the outer surface of said loader wheels, said loader wheels being operative to receive fruit portions and to seat the same in the groove of the said feeder wheel, and a reamer adjacent said feeder wheel and extending into the groove thereof, the said reamer rotating about a horizontal axis in a direction opposite to and at a speed substantially in excess of that of the said feeder wheel.

9. In a machine of the class described, a vertical feeder wheel having a fruit portion receiving peripheral annular groove therein and adapted to rotate about a horizontal axis, a pair of spaced loader wheels adjacent said feeder wheel, the longitudinal axes of said loader wheels being tangential to the said feeder wheel, the loader wheels being adapted to rotate in opposite directions about their said axes, and a reamer extending into the groove of said feeder wheel and adapted to rotate about a horizontal axis in a direction opposite to and at a speed substantially in excess of that of said feeder wheel.

10. In a machine of the class described, a vertical feeder wheel having a fruit portion receiving peripheral annular groove therein and adapted to rotate about a horizontal axis, a pair of spaced loader wheels adjacent said feeder wheel, the longitudinal axes of said loader wheels being tangential to the said feeder wheel, the said feeder wheels being adapted to rotate in opposite directions about their said axes, fruit gripping means disposed about the outer surface of the said loader wheels, said loader wheels being operative to receive fruit portions and to seat the same into the groove of the said feeder wheel, and a reamer adjacent said feeder wheel operative to engage said fruit portions, the said reamer having a horizontal axis and being adapted to rotate about said axes in a direction opposite to and at a speed substantially in excess of that of the feeder wheel.

11. In a machine of the class described, a vertical feeder wheel having a fruit portion receiving peripheral annular groove therein and adapted to rotate about a horizontal axis, a pair of spaced loader wheels adjacent said feeder wheel having longitudinal axes substantially tangential to the said feeder wheel and adapted to rotate in opposite directions about said axes, fruit gripping means disposed about the outer surface of said loader wheels, said loader wheels being operative to receive fruit portions and to seat the same in the groove of the said feeder wheel, a reamer adjacent said feeder wheel and extending into the groove thereof to engage the said fruit portions, the said reamer being adapted to rotate about a horizontal axis in a direction opposite to and at a speed substantially in excess of that of the said feeder wheel, and a separator grid disposed about the lower portion of the said feeder wheel and operative to separate the juice of the said fruit from the peel thereof after the said fruit portions have been engaged by the said reamer.

12. In a machine of the class described, a vertical feeder wheel having a fruit portion receiving peripheral annular groove therein and adapted to rotate about a horizontal axis, a pair of spaced loader wheels adjacent said feeder wheel having longitudinal axes substantially tangential to the said feeder wheel and adapted to rotate oppositely about said axes, fruit gripping means disposed about the outer surface of said loader wheels, said loader wheels being operative to receive fruit portions and to seat the same in the groove of the said feeder wheel, a reamer adjacent said feeder wheel and extending into the groove thereof to engage the said fruit portions, the said reamer being adapted to rotate about a horizontal axis in a direction opposite to and at a speed substantially in excess of that of the said feeder wheel, a stripper arm extending into the groove of said feeder wheel and adapted to remove fruit peels from said feeder wheel after the said fruit portions have been so engaged by the said reamer, and a separator grid disposed about the lower portion of the said feeder wheel and operative to separate the juice of the said fruit from the said peel thereof after the said fruit portions have been engaged by the said reamer.

13. In a machine of the class described, a vertical, imperforate feeder wheel having a fruit portion receiving peripheral annular groove therein and adapted to rotate about a horizontal axis, a pair of spaced, substantially identical loader wheels adjacent said feeder wheel, the longitudinal axes of said loader wheels being tangential to the said feeder wheel, the said feeder wheels being adapted to rotate in opposite directions about their said axes, fruit gripping means disposed about the outer surface of the said loader wheels, said loader wheels being operative to receive fruit portions and to seat the same into the groove of the said feeder wheel, and a reamer adjacent said feeder wheel operative to engage said fruit portions, the said reamer having a horizontal axis and being adapted to rotate about said axis in a direction opposite to and at a speed substantially in excess of that of the feeder wheel.

14. In a machine of the class described, a vertical feeder wheel having a fruit portion receiving peripheral annular groove therein and adapted to rotate about a horizontal axis, said annular groove being semi-elliptical in cross section, a pair of spaced loader wheels adjacent said feeder wheel, the longitudinal axes of said loader wheels being tangential to the said feeder wheel, the said feeder wheels being adapted to rotate in opposite directions about their said axes, fruit gripping means disposed about the outer surface of the said loader wheels, said loader wheels being operative to receive fruit portions and to seat the same into the groove of the said feeder wheel, and a reamer adjacent said feeder wheel operative to engage said fruit portions, the said reamer having a horizontal axis and being adapted to rotate about said axes in a direction opposite to and at a speed substantially in excess of that of the feeder wheel, and said reamer having a cross section generally conforming to the cross section of said annular groove.

CARL HARDEN.

References Cited in the file of this patent

UNITED STATES PATENTS

| Number | Name | Date |
| --- | --- | --- |
| 2,212,066 | Fry | Aug. 20, 1940 |
| 2,235,744 | Gould | Mar. 18, 1941 |
| 2,241,081 | Clark | May 6, 1941 |
| 2,288,756 | Thompson | July 7, 1942 |
| 2,538,590 | Polk | Jan. 16, 1951 |
| 2,540,014 | Smith | Jan. 30, 1951 |